United States Patent
Li et al.

(10) Patent No.: US 7,862,627 B2
(45) Date of Patent: Jan. 4, 2011

(54) THIN FILM BATTERY SUBSTRATE CUTTING AND FABRICATION PROCESS

(75) Inventors: Jianchao Li, El Monte, CA (US); Kai-Wei Nieh, Monrovia, CA (US); Sandeep Makhar, Temple City, CA (US)

(73) Assignee: Front Edge Technology, Inc., Baldwin Park, CA (US)

( * ) Notice: Subject to any disclaimer, the term of this patent is extended or adjusted under 35 U.S.C. 154(b) by 881 days.

(21) Appl. No.: 11/796,487

(22) Filed: Apr. 27, 2007

(65) Prior Publication Data

US 2008/0263855 A1    Oct. 30, 2008

(51) Int. Cl.
*H01M 4/82*     (2006.01)
*H01M 6/12*     (2006.01)

(52) U.S. Cl. .................... 29/623.5; 429/162
(58) Field of Classification Search ................ 429/162; 29/623.5; 264/152
See application file for complete search history.

(56) References Cited

U.S. PATENT DOCUMENTS

| | | |
|---|---|---|
| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,119,769 A | 10/1978 | Schneider et al. |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |

(Continued)

FOREIGN PATENT DOCUMENTS

CN    1661354A A    8/2005

(Continued)

OTHER PUBLICATIONS

PCT Search Report and Written Opinion in re: PCT/US208/005462, Jul. 27, 2008.

(Continued)

*Primary Examiner*—Patrick Ryan
*Assistant Examiner*—Thomas H. Parsons
(74) *Attorney, Agent, or Firm*—Jonah & Associates P.C.; Ashok K. Jonah

(57) ABSTRACT

A method of fabricating a battery comprises selecting a battery substrate having cleavage planes, and cutting the battery substrate with pulsed laser bursts from a pulsed laser beam to control or limit fracture along the cleavage planes. The pulsed laser beam was also found to work well on thin substrates which are sized less than 100 microns. Before or after the cutting step, a plurality of battery component films can be deposited on the battery substrate. The battery component films include at least a pair of electrodes about an electrolyte which cooperate to form a battery.

20 Claims, 8 Drawing Sheets

U.S. PATENT DOCUMENTS

| | | |
|---|---|---|
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,597,660 A | 1/1997 | Bates et al. |
| 5,612,152 A | 3/1997 | Bates et al. |
| 5,656,364 A | 8/1997 | Rickerby et al. |
| 5,670,252 A | 9/1997 | Makowiecki et al. |
| 5,670,272 A | 9/1997 | Cheu et al. |
| 5,700,551 A | 12/1997 | Kukino et al. |
| 5,705,293 A | 1/1998 | Hobson |
| 5,705,297 A | 1/1998 | Warren |
| 5,786,582 A | 7/1998 | Roustaei et al. |
| 5,824,374 A | 10/1998 | Bradley, Jr. et al. |
| 5,871,865 A | 2/1999 | Barker et al. |
| 5,894,656 A | 4/1999 | Menon et al. |
| 5,961,672 A | 10/1999 | Skotheim et al. |
| 5,985,485 A | 11/1999 | Ovshinsky et al. |
| 6,017,654 A | 1/2000 | Kumta et al. |
| 6,022,640 A | 2/2000 | Takada et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,238,847 B1 | 5/2001 | Axtell, III et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,517,968 B2 | 2/2003 | Johnson |
| 6,558,836 B1 | 5/2003 | Whitacare et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,713,987 B2 | 3/2004 | Krasnov et al. |
| 6,863,699 B1 | 3/2005 | Krasnov et al. |
| 6,921,464 B2 | 7/2005 | Krasnov et al. |
| 6,940,988 B1 | 9/2005 | Shennib et al. |
| 7,037,621 B2 | 5/2006 | Kikuchi et al. |
| 7,056,620 B2 | 6/2006 | Krasnov et al. |
| 7,186,479 B2 | 3/2007 | Krasnov et al. |
| 7,286,479 B2 | 10/2007 | Bragg |
| 2001/0041294 A1 | 11/2001 | Chu et al. |
| 2002/0004167 A1 | 1/2002 | Jenson et al. |
| 2002/0028384 A1 | 3/2002 | Krasnov et al. |
| 2002/0071989 A1 | 6/2002 | Verma et al. |
| 2002/0110733 A1 | 8/2002 | Johnson |
| 2002/0150823 A1 | 10/2002 | Breitkopf et al. |
| 2003/0121142 A1 | 7/2003 | Kikuchi et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2005/0079418 A1 | 4/2005 | Kelley et al. |
| 2005/0130032 A1 | 6/2005 | Krasnov et al. |
| 2005/0156573 A1 | 7/2005 | Lin |
| 2006/0040169 A1 | 2/2006 | Liu et al. |
| 2006/0040170 A1 | 2/2006 | Liu et al. |
| 2006/0068258 A1 | 3/2006 | Kinoshita |
| 2006/0115706 A1 | 6/2006 | Maeda et al. |
| 2006/0216589 A1 | 9/2006 | Krasnov et al. |
| 2007/0037054 A1 | 2/2007 | Kikuchi et al. |
| 2007/0047750 A1 | 3/2007 | Sauer et al. |
| 2007/0166612 A1 | 7/2007 | Krasnov et al. |
| 2008/0213664 A1 | 9/2008 | Krasnov et al. |
| 2009/0010462 A1 | 1/2009 | Ekchian et al. |
| 2009/0057136 A1 | 3/2009 | Wang et al. |

FOREIGN PATENT DOCUMENTS

| | | |
|---|---|---|
| EP | 0 829 913 A | 3/1998 |
| EP | 1 458 037 A | 9/2004 |
| FR | 2 403 652 A | 4/1979 |
| GB | 2251119 A | 6/1992 |
| JP | 59-032023 A | 2/1984 |
| JP | 59-226472 A | 12/1984 |
| JP | 60-072168 | 4/1985 |
| JP | 61195563A A1 | 8/1986 |
| JP | 09-259929 A | 10/1997 |
| JP | 2001-044073 A | 2/2001 |
| JP | 2003-249199 A | 9/2003 |
| WO | WO-95/14311 A | 5/1995 |
| WO | WO-99/23714 | 5/1999 |
| WO | WO-00/60689 A | 10/2000 |
| WO | WO-01/73873 A | 10/2001 |
| WO | WO-02/21627 A3 | 3/2002 |
| WO | WO-02/42516 A3 | 5/2002 |
| WO | WO-03/005477 A3 | 1/2003 |
| WO | WO-03/061049 A | 7/2003 |
| WO | WO-03/073531 A3 | 12/2003 |
| WO | WO-2006/105050 A3 | 10/2006 |
| WO | WO-2006/105188 A1 | 10/2006 |
| WO | WO-2008/108999 A3 | 11/2008 |
| WO | WO-2008/134053 A1 | 11/2008 |

OTHER PUBLICATIONS

Bates et al., "Preferred orientation of polycrystalline LiCoO2 films" J. of the Electrochemical Society (2000), pp. 59-70, Issue No. 147 (1).

Roh et al., "Effects of deposition condition on the ionic conductivity . . ." Scripta Materialia, pp. 43-49, vol. 42. No. 1, New York, NY, Jun. 17, 1998.

Bolster et al., "Investigation of lithium intercalation metal oxides for thermalbatteries" Proceedings of the 34th Int'l Power Source Symposium, Jun. 25-28, 1990, pp. 136-140.

Wagner et al., "Fabrication and Testing of thermoelectric thin film devices" 15th Int'l Conf. on Thermoelectrics, Mar. 26-29, 1996, pp. 269-273.

Neudecker et al., "Lithium-Free Thin-Film Battery . . . " Journal of the Electrochemical Society (2000), pp. 517-523, Issue No. 147 (2).

Park et al., "Characterization of tin oxide/LiMn2O4 thin-film cell," Journal of Power Sources, Jun. 2000, pp. 250-254, vol. 88, No. 2, Elsevier Science S.A.

Yang et al., "Effect of annealing temperature on structure and electrochemical properties of $LiCoO_2$ cathode thin films", Rare Metals, vol. 25, Dec. 2006, pp. 189-192.

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.

Antaya et al. "Preparation and Characterization of LiCoO2 Thin Films by Laser Ablation Deposition", J. Electrochem. Soc., vol. 140, No. 3, Mar. 1993, pp. 575-578.

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Jenson, Mark, (unpublished) U.S. Appl. No. 60/191,774, "Comprehensive patent for the fabrication of a high volume, low cost energy products such as solid state lithium ion rechargeable battery, supercapacitors and fuel cells", filed Mar. 24, 2000.

Jenson et al., (unpublished) U.S. Appl. No. 60/225,134, "Apparatus and method for rechargeable batteries and for making and using batteries", Aug. 14, 2000.

Jenson et al., (unpublished) U.S. Appl. No. 60/238,673, "Battery Having Ultrathin Electrolyte", filed Oct. 6, 2000.

Krasnov et al., (unpublished) U.S. Appl. No. 11/946,819, "Thin Film Battery Comprising Stacked Battery Cells and Method", filed Nov. 28, 2007.

Nieh et al., (unpublished) U.S. Appl. No. 12/032,997, "Thin Film Battery Fabrication Using Laser Shaping", filed Feb. 18, 2008.

PCT International Search Report in Application No. PCT/US2008/013213 (WO 2009/073150 A1), mailed Jun. 18, 2009.

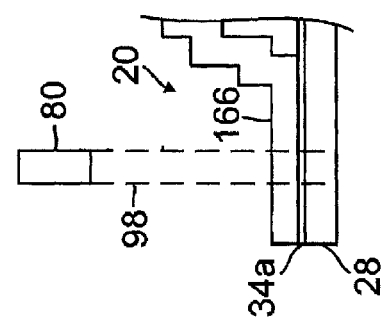
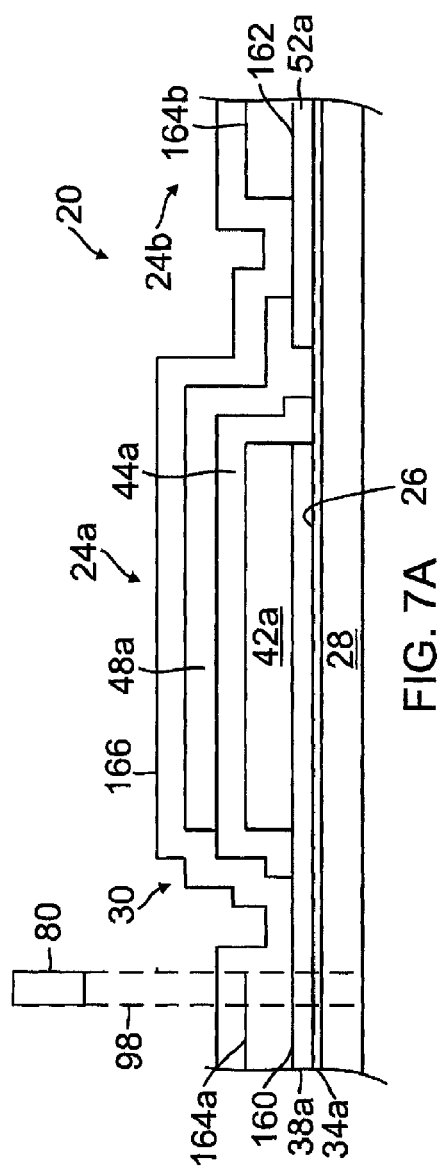
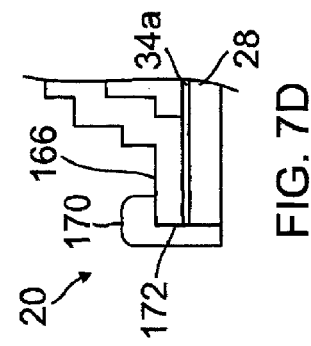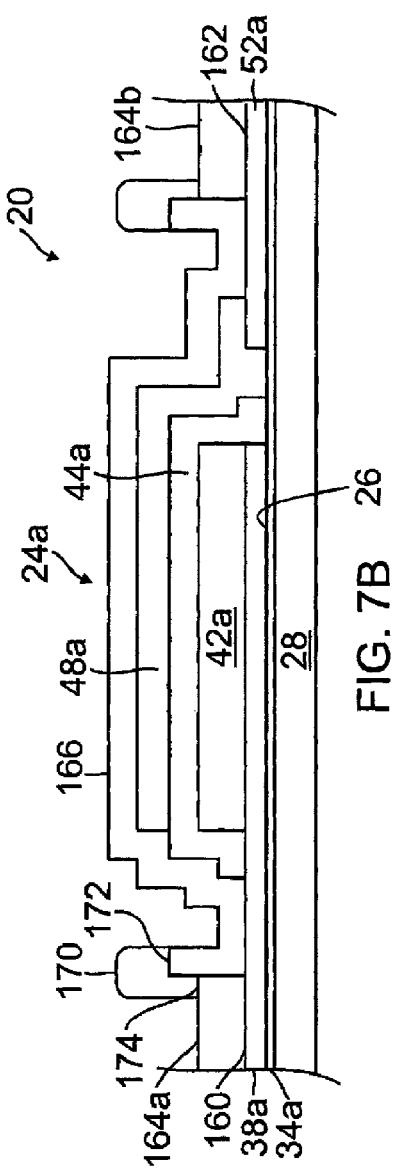

THIN FILM BATTERY SUBSTRATE CUTTING AND FABRICATION PROCESS

BACKGROUND

Embodiments of the present invention relate to a method of fabricating thin film batteries on a substrate which uses a cutting process.

Thin film batteries are used in various applications, such as portable electronics, medical devices and space systems. A thin film battery typically comprises a substrate having one or more battery component films that include an electrolyte sandwiched between electrode films such an anode, cathode, and/or current collector films, that cooperate to store electrical charge and generate a voltage. The battery component films that are typically less than 100 microns allowing the thin film batteries to be less than about $\frac{1}{100}^{th}$ of the thickness of conventional batteries. The battery component films are formed by processes, such as for example, physical and chemical vapor deposition (PVD or CVD), oxidation, nitridation, and electroplating.

Furthermore, in many applications, thin film batteries having thin or compact dimensions are desirable and the energy density and specific energy of the battery are also important performance measures. The energy density level is the fully charged output energy level per unit volume of the battery. The specific energy level is the fully charged output energy level per unit weight of the battery. However, conventional battery films and substrate materials often constrain the size dimensions, and limit the maximum energy density and specific energy levels that can be obtained from such batteries.

Battery performance can be improved by forming the battery on thin plate-like substrates, such as for example ceramic substrates composed of $Al_2O_3$ or $SiO_2$, which increase the energy to volume/weight ratio of the battery. In such processes, an array of battery cells is formed on the plate-like substrate, and thereafter, individual battery cells are mechanically cut out from the substrate. As one example, the battery cells can be cut out with a diamond or carbide cutting wheel. However, the battery cells are often damaged due to cracking along the edges of the cut. Micro-cracks that originate from the fracture points along the cutting line can also affect the performance of the thin film battery cells and result in cell failure. Increasing the width along the cutting edge to provide a wider gap or spacing between the battery cells is undesirable because it decreases the energy density of the final battery cells and also reduces substrate yields per unit area. The cutting process can also contaminate the battery cells with the cutting or grinding residue. Further, handling of the thin plate-like substrates with micron sized battery films is difficult during the cutting process because some battery component films, such as for example, lithium or other films, are adversely affected when exposed to air or moisture. Thus, for a number of reasons, conventional battery cutting processes are often inadequate and result in low battery cell yields.

Cutting of the battery cells is even more problematic when the battery cells are built on very crystalline substrates having cleavage places. For example, mica substrates have been used to reduce the total weight and volume of the battery while providing good mechanical strength for the battery cells and dielectric strength. Mica has a flat planar structure with cleavage properties that allow mica to be split into thin foils along its cleavage planes. Thus, the mica substrate can be made very thin with thicknesses of less than about 100 microns or even less than about 25 microns. However, it is difficult to cut a substrate comprising a mica sheet because the substrate can split along the cleavage planes while it is being cut. Thus, cutting of sheet-like substrates with cleavage planes generates special cutting problems.

Thus it is desirable to be able to cut a substrate to form individual battery cells without damaging the cells. It is also desirable to be able to cut a battery substrate composed of mica without causing cleavage faults along the cutting line. It is further desirable not to contaminate the thin films that form the battery cells with grinding or cutting residue. It is also desirable to reduce oxidation of battery cells during processing by their exposure to the external environment.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

Figure 6C:
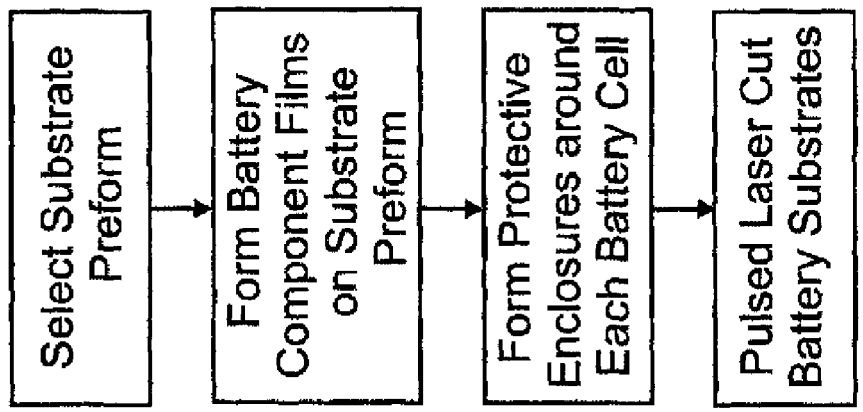
Figure 6B:
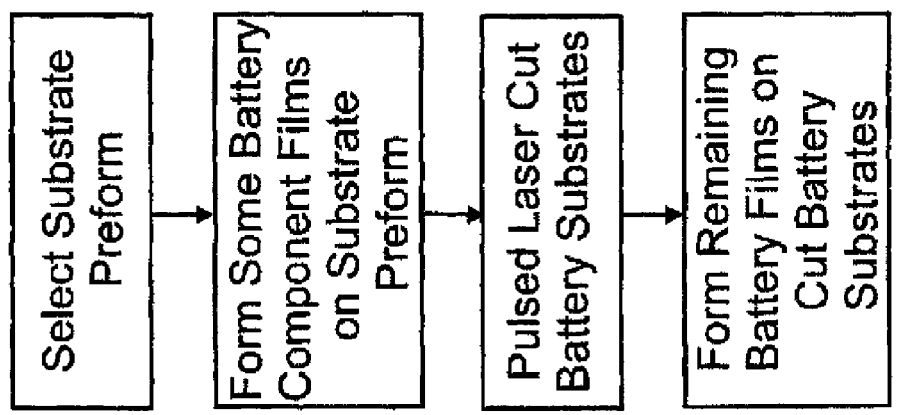
Figure 6A:
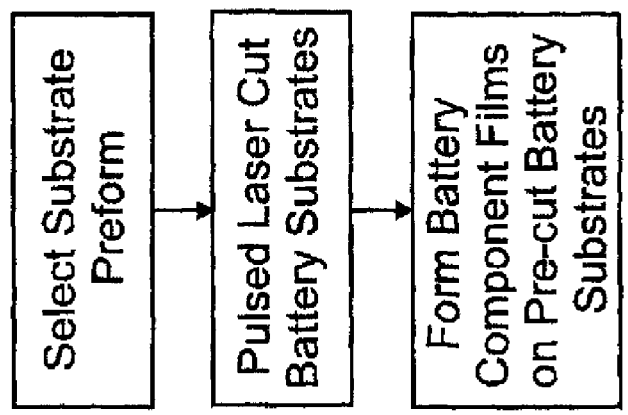

FIGS. 6A to 6C are flowcharts of different embodiments of processes for cutting a battery substrate with or without battery component films on the substrate; and FIGS. 7A to 7D are schematic sectional side views showing cutting and sealing of the laser cut edge of a battery substrate comprising battery cells having battery component films, electrically conducting barrier layer on contact portions used for the positive and negative terminals, and an overlying protective multilayer coating.

DESCRIPTION

Figure 1A:
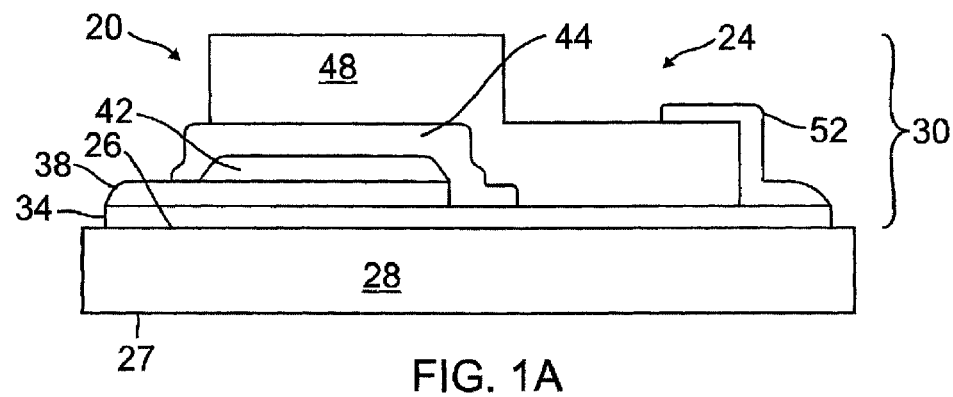
FIG. 1A is a schematic sectional side view of an embodiment of a thin film battery formed on a planar surface of a substrate.
Figure 1B:
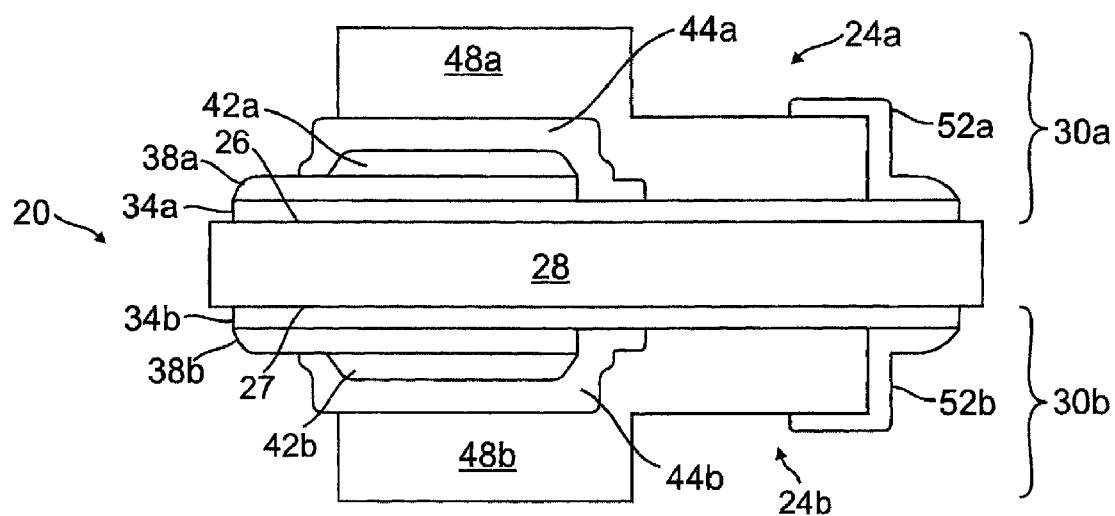
FIG. 1B is a schematic sectional side view of another embodiment of a battery showing twin battery cells formed on opposing surfaces of the substrate.
Figure 2:
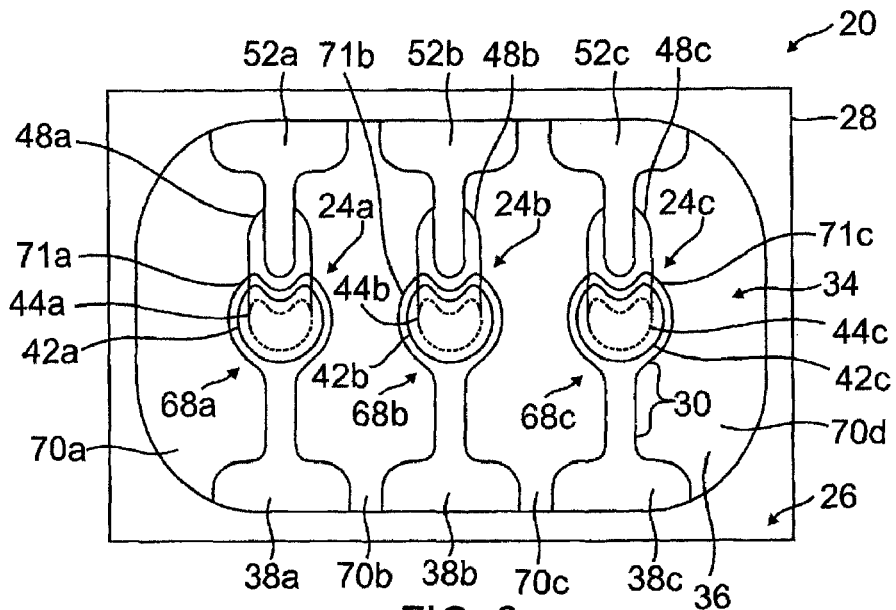
FIG. 2 is a schematic top view of an embodiment of a thin film battery having multiple battery cells on a single surface.

Embodiments of thin film batteries 20 comprising one or more battery cells 24a-c on a planar surface 26 of a substrate 28 are illustrated in FIGS. 1A, 1B and 2. The thin film battery 20 can also have a single battery cell 24 on a single side of a substrate 28 as shown in FIG. 1A; multiple battery cells 24a,b on opposing surfaces of a substrate 28 as shown in FIG. 1B; or multiple battery cells 24a-c on the same surface of a substrate 28 as shown in FIG. 2. Referring to FIG. 1A, the battery cell 24 comprises a plurality of battery component films 30 formed on an adhesion layer 34. The battery component films 30 cooperate to form a battery to receive, store, or discharge electrical energy. The films 30 can be employed in a number of different arrangements, shapes, and sizes. At a minimal level, the battery component films 30 include at least a pair of electrode films with an electrolyte film 44. The electrode films can include one or more of a cathode current collector film 38, a cathode film 42, an anode film 48, and an anode current collector film 52, which are all inter-replaceable. For example, the battery 20 can include (i) a pair of cathode and anode films or a pair of current collector films, (ii) both the anode/cathode films and the current collector films, or (iii) various combinations of these films, for example, a cathode film and an anode and anode current collector film but not a cathode current collector film, and so on. The exemplary versions of the battery 20 illustrated herein are provided to demonstrate features of the battery and to illustrate their processes of fabrication; however, it should be understood that the exemplary battery structures should not be used to limit the scope of the invention, and alternative battery structures as would be apparent to those of ordinary skill in the art are within the scope of the present invention.

Referring to FIG. 1B, the battery 20 can include a first battery cell 24a on a first planar surface 26 of the substrate 28, and a second battery cell 24b on a second planar surface 27 of the same substrate 28. Each battery cell 24a,b comprises a plurality of battery component films 30a,b that include one or more adhesion films 34a,b; first or cathode current collector films 38a,b; cathode films 42a,b; electrolyte films 44a,b; anode films 48a,b; and second or anode current collector films 52a,b. This version of the battery 20 with two opposing cells 24a,b can be formed using the same processes used to form the battery 20 with the single cell 24 (FIG. 1A), by flipping over the substrate 28 to form the battery film components 30b of the second battery cell 24b, during or after processing of the first battery cell 30a. Alternatively, the battery film components 30b of the second battery cell 24b can be formed simultaneously with the battery film components 30a of cell 24a, using chambers having multiple process zones as described below.

Figure 3:
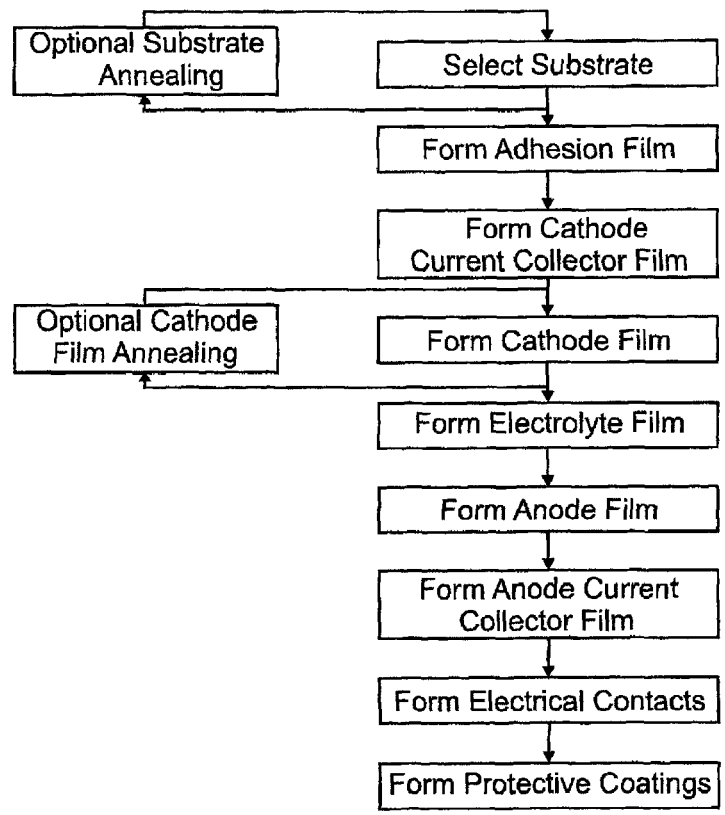
FIG. 3 is a flowchart of an embodiment of a process for forming a set of battery component films on a substrate.

An exemplary embodiment of a method of forming the battery component films 30 on a battery substrate 28 to fabricate a battery 20, is illustrated in FIG. 3. In the first step, a suitable substrate 28 is selected, the substrate 28 being a dielectric having sufficient mechanical strength to support battery component films 30 and a smooth surface for deposition of thin films. Suitable substrates 28 can be made from, for example, ceramic oxides such as aluminum oxide or silicon dioxide; metals such as titanium and stainless steel; semiconductors such as silicon; or even polymers. One desirable substrate comprises a crystalline sheet formed by cleaving the planes of a cleavable crystalline structure. The cleavable crystalline structure splits along definite planes to create flat surfaces, and can include (i) basal cleavage crystals having cleavage planes parallel to the base of a crystal or to the plane of the lateral axes; (ii) cubic cleavage crystals having cleavage planes parallel to the faces of a cube, (iii) diagonal cleavage crystals which has cleavage planes parallel to a diagonal plane; (iv) lateral cleavage crystals which have cleavage planes parallel to the lateral planes; (v) octahedral, dodecahedral, or rhombohedral cleavage crystals in which cleavage occurs parallel to the faces of an octahedron, dodecahedron, or rhombohedron (respectively); and (vi) prismatic cleavage crystals in which cleavage occurs parallel to a vertical prism. The crystalline cleaving structure can be, for example, mica or graphite. Mica can be split into thin crystal sheets having thicknesses of less than about 100 microns or even less than about 25 microns, as described in commonly assigned U.S. Pat. No. 6,632,563 "THIN FILM BATERY AND METHOD OF MANUFACTURE", filed on Sep. 9, 2000, which is incorporated by reference herein and in its entirety.

The selected substrate 28 is optionally annealed to temperatures sufficiently high to clean the cleavage plane surface by burning-off contaminants and impurities, such as organic materials, water, dust, and other materials formed or deposited on the planar surfaces 26, 27 of the substrate 28; or even heating to temperatures high enough to remove any water of crystallization that may be present within the substrate. The annealing temperatures can be from about 150 to about 600° C., even at least about 400° C., or even at least about 540° C. The annealing process can be conducted in an oxygen-containing gas, such as oxygen or air, or other gas environments, for about 10 to about 120 minutes, for example, about 60 minutes. The cleaning process can also be conducted in an oxygen plasma containing cleaning step. Suitable annealing and other cleaning processes are described, for example, in U.S. patent application Ser. No. 11/681,754, "THIN FILM BATTERY AND MANUFACTURING METHOD", filed on Mar. 2, 2007, which is incorporated by reference herein in its entirety.

After the substrate cleaning and annealing step, a plurality of battery component films 30 are deposited on the surfaces 26, 27 of the substrate 28 in a series of process steps to form battery cells 24 that can generate or store electrical charge. While a particular sequence of process steps is described to illustrate an embodiment of the process, it should be understood that other sequences of process steps can also be used as would be apparent to one of ordinary skill in the art.

In one embodiment, the battery component films 30 include an adhesion film 34 which is deposited on the planar surface 26 of the substrate 28 to improve adhesion of overlying battery component films 30 (FIG. 1A). The adhesion film 34 can comprise a metal or metal compound, such as for example, aluminum, cobalt, titanium, other metals, or their alloys or compounds thereof; or a ceramic oxide such as, for example, lithium cobalt oxide. When the adhesion film 34 is fabricated from titanium, the titanium film is deposited in a sputtering chamber with, for example, the following process conditions: argon maintained at a pressure of 2 mTorr; DC (direct current) sputtering plasma at a power level of 1 kW, a deposition time 30 seconds, a titanium target size of 5×20 inches, and a target to substrate distance of 10 cm. In the version shown in FIG. 1B, after deposition of a first adhesion film 34a on the first planar surface 26 of the substrate 28, the substrate 28 is flipped over and a second adhesion film 34b is deposited on the second planar surface 27 which forms other side of the substrate. The adhesion film 34 can deposited on the substrate 28 not only to cover the area under the subsequently deposited battery cells 24a-c and their battery component films 30 but also the area 36 extending beyond the battery component films 30, as described in aforementioned U.S. patent application Ser. No. 11/681,754. The adhesion film 34 is deposited in a thickness of from about 100 to about 1500 angstroms.

A cathode current collector film 38 is formed on the adhesion film 34 to collect the electrons during charge and discharge process. The cathode current collector film 38 is typically a conductor and can be composed of a metal, such as aluminum, platinum, silver or gold. The current collector film 38 may also comprise the same metal as the adhesion film 34 provided in a thickness that is sufficiently high to provide the desired electrical conductivity. A suitable thickness for the first current collector film 38 is from about 0.05 microns to about 2 microns. In one version, the first current collector film 38 comprises platinum in a thickness of about 0.2 microns. The cathode current collector film 38a-c can be formed as a pattern of features 68a-c, as illustrated in FIG. 2, that each comprise a spaced apart discontinuous region that covers a small region of the adhesion film 34. The features 68a-c are over the covered regions 71a-c of the adhesion film 34, and adjacent to the features 68a-c are exposed regions 70a-c of the adhesion film 34. To deposit the patterned film 38a-c, a patterned mechanical mask is placed on top of the substrate 28, and a first current collector film 38 of platinum is deposited by DC magnetron sputtering to form the features 68a-c between the patterned mask regions. The sputtering conditions for the depositing a platinum film from a platinum target uses sputtering gas comprising argon at a gas pressure of 5 mTorr to form a DC plasma at a power level of 40 W for 10 minutes. After forming the features 68a-c on the adhesion film 34, the adhesion film with its covered regions 71a-c below the patterned features 68a-c and exposed surface regions 70a-d, is then exposed to an oxygen-containing environment and heated to temperatures of from about 200° C. to about 600° C., for example, about 400° C., for about an hour, to oxidize the exposed regions 70a-d of titanium that surround the deposited platinum features but not the titanium regions covered and protected by the platinum features. The resultant structure, advantageously, includes not only the non-exposed covered regions 71a-c of adhesion film 34 below the features 68a-c of the current collector film 38, but also oxygen-exposed or oxidized regions 70a-d which form non-conducting regions that electrically separate the plurality of battery cells 24a-c formed on the same substrate 28.

The cathode film 42 comprises an electrochemically active material is then formed over the current collector film 38. In one version, the cathode film 42 is composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. Other types of cathode films 42 that may be used comprise amorphous vanadium pentoxide, crystalline $V_2O_5$ or $TiS_2$. The cathode film can be deposited as a stack of films, with alternate deposition and annealing steps, as for example, described in aforementioned U.S. patent application Ser. No. 11/681,754. The stress reducing annealing step is performed at a temperature of 200 to about 500° C. Typically, the cathode film stack has a thickness of at least about 5 microns, or even at least about 10 microns. The cathode film 42 can also be annealed in a defect reducing step to temperatures from about 150 to about 700° C., for example, about 540° C., to further improve the quality of the cathode film 42 by reducing the amount of defects.

In one example, the cathode film 42 comprises crystalline lithium cobalt oxide, which in one version, has the stoichiometric formula of $LiCoO_2$. The crystalline lithium cobalt oxide film is fabricated using a multiple sequential deposition and stress reducing annealing step as described. The lithium cobalt oxide can be deposited using a magnetron sputtering process with a lithium cobalt oxide target, argon and oxygen at a flow rate ratio of $Ar/O_2$ of from about 1 to about 45; a chamber gas pressure of from about 5 to about 25 mTorr; plasma power levels of from about 200 to about 1000 Watts; a potential of −5 to −200 V on the substrate; and a substrate temperature of from about 100 to about 200° C.

An electrolyte film 44 is formed over the cathode film 42. The electrolyte film 44 can be, for example, an amorphous lithium phosphorus oxynitride film, also known as a LiPON film. In one embodiment, the LiPON has the stoichiometric form $Li_xPO_yN_z$ in an x:y:z ratio of about 2.9:3.3:0.46. In one version, the electrolyte film 44 has a thickness of from about 0.1 µm to about 5 µm. This thickness is suitably large to provide sufficiently high ionic conductivity and suitably small to reduce ionic pathways to minimize electrical resistance and reduce stress.

An anode film 48 formed over the electrolyte film 44. The anode film 48 can be the same material as the cathode film, as already described. A suitable thickness is from about 0.1 µm to about 20 µm. In one version, anode film 48 is made from lithium which is also sufficiently conductive to also serve as the anode current collector film 52, and in this version the anode film 48 and anode current collector film 52 are the same. In another version, the anode current collector film 52 is formed on the anode film 48, and comprises the same material as the cathode current collector film 38 to provide a conducting surface from which electrons may be dissipated or collected from the anode film 48. For example, in one version, the anode current collector film 52 comprises a non-reactive metal such as silver, gold, platinum, in a thicknesses of from about 0.05 µm to about 5 µm.

After the deposition of all the battery component films 30, a variety of protective layers or electrically conducting layers can be formed over the battery component films 30 to provide protection against environmental elements. In one example, the protective layer comprises a plurality of metal and ceramic layers that are superimposed on each other. In another example, a portion of the cathode current collector film 38 or anode current collector film 52 that extends out from under a battery cell 24 forms a contact portion that is used to connect the battery cell 24 or the battery 20 to the external environment. This contact portion is coated with an electrically conducting barrier layer in a thickness sufficiently large to prevent the pulsed laser beam from penetrating therethrough.

The thin film battery 20 can also be fabricated to provide a plurality of battery cells 24a-c on a single substrate 28. The battery cells 24a-c can be arranged horizontally across a single substrate surface 26 or fabricated on the front surface 26 and backside surface 27 of a battery substrate 28 to substantially increase the energy density and capacity of the battery cell 24. Suitable battery configurations, protective layers, and packaging, are described in for example, U.S. patent application Ser. No. 11/090,408, filed on Mar. 25, 2005, entitled "THIN FILM BATTERY WITH PROTECTIVE PACKAGING" by Krasnov et al., which is incorporated by reference herein and in its entirety.

A battery substrate preform 78 is cut into smaller pieces that each form battery substrates 28 with having individual batteries 20 thereon, in a pulsed laser cutter 80, an embodiment of which is shown in FIG. 3. The battery substrate preform 78 is simply a larger section of the battery substrate material, and it can be cut into the smaller battery substrates 28, before, after partially completion of, or after entirely completing, processing battery component films 30 that cooperate to form one or more battery cells 24a-c on each battery substrate 28. The pulsed laser cutter 80 comprises a pulsed laser source 82, a movable stage 84, a laser optical system 86, and a programmable controller 88. In the battery cutting process, a selected battery substrate 28 is placed on a stage surface 90 of the movable stage 84, and is held thereon by a vacuum port or mechanical clamp. The movable stage 84 can be an automated 4-axis translation stage that can move laterally along the X-Y plane, and optionally also vertically along the Z-axis, and which is powered by a stage motor 92 which is controlled by the programmed controller 88. The movable stage 84 can have a surface groove 94 which allows a pulsed laser beam 98 from the pulsed laser source 82 to penetrate through the battery substrate 28 and into the surface groove 94 without cutting or damaging the surface 90 of the stage 84. The programmable controller 88 comprises a conventional controller, such as automated 4-axis translation stage, which can be programmed with a computer implemented software code to send signals to the stage motor 92 (or motors) to move the movable stage 84 in the desired cutting pattern.

In one version, the pulsed laser cutting process is conducted in a dry box 91 or dry room which is absent oxygen or moisture when cutting a battery substrate preform 78 which has previously deposited battery component films 30 that can oxidize, such as lithium or LIPON films. A gas nozzle 93 can also be used to blow a gas stream 95 of blowing gas onto the laser cutting region on the battery substrate preform 78 to remove any laser cutting debris or vapors from the cutting area. The gas nozzle 93 obtains the blowing gas from a gas source 96 and the gas flow rate or pressure can be controlled by a gas flow controller 97. The blowing gas can be air, argon, nitrogen, or a mixture of such gases, and the pressure of the gas can be, for example, at least 2 $Kg/cm^3$. In the cutting process, a low power laser (not shown) can also be used to indicate the cutting position of the pulsed laser beam 98 on the substrate preform 78, such as for example, a He—Ne laser.

Figure 4:
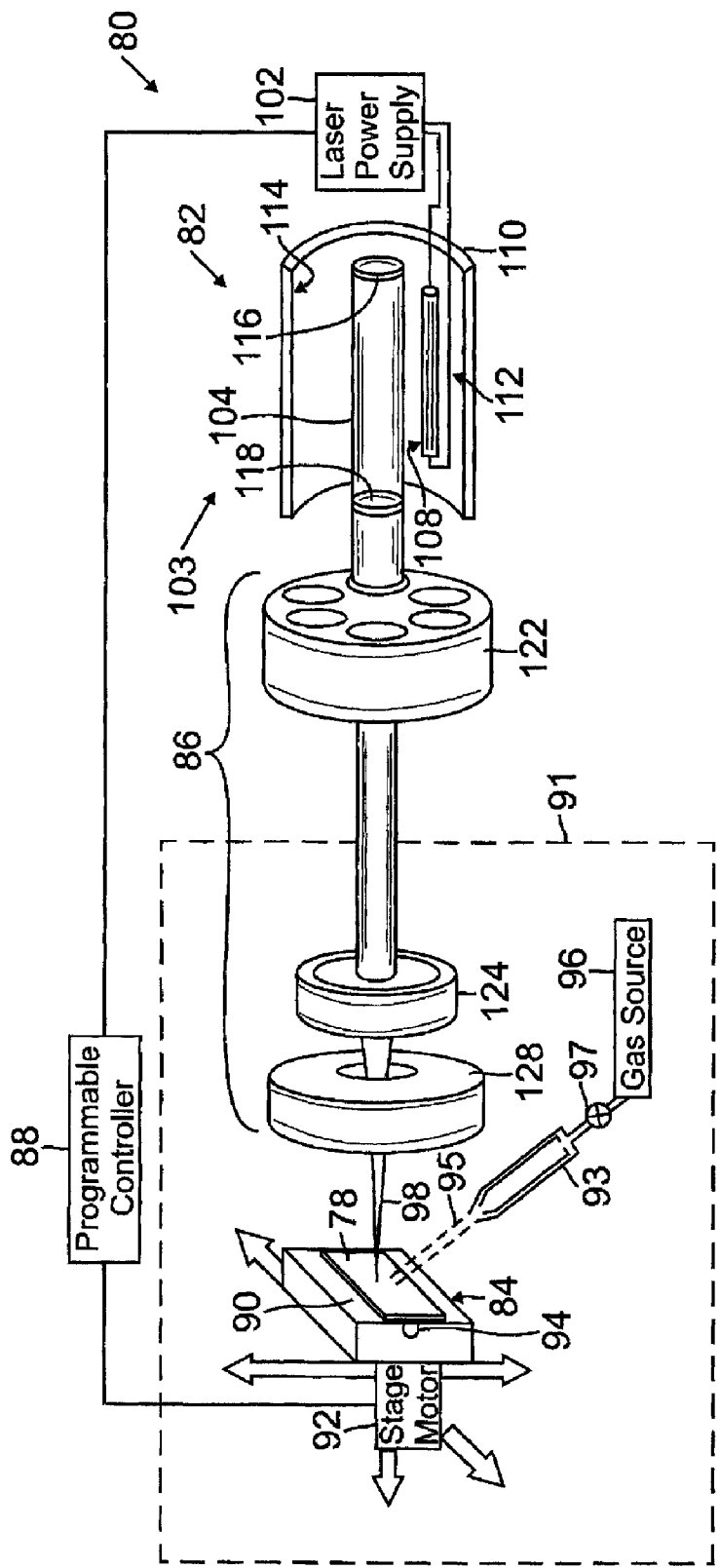
FIG. 4 is a schematic diagram of an embodiment of a pulsed laser cutter for cutting a battery substrate.

The pulsed laser source 82 is positioned above the movable stage 84 is powered by a laser power supply 102 to generate a pulsed laser beam 98 as shown in FIG. 4. An exemplary pulsed laser source 82 that can provide pulsed laser bursts comprises a lasing medium 104 and laser light source 108 positioned at the twin focal points of a light resonator 110, as shown in FIG. 4. The lasing medium 104 can be a solid-state rod material such as a titanium doped sapphire, Nd:YAG, a chrominum ion doped ruby; or a gas laser which uses a combination of an inert gas and reactive gas to generate the laser beam. The light resonator 110 comprises an elliptical cavity 112 having reflective surfaces 114 which reflect photons emitted from the light source toward the lasing medium 104. These photons resonate in the lasing medium 104 between a highly reflective mirror 116 and a partially reflective output coupler 118 at either end of the lasing medium 104. The generated laser beam 120 is emitted through the partially reflective output coupler 118. For efficiency, the composition and concentration of the lasing medium 104, as well as the construction of the elliptical cavity 112 of the light resonator 110, the mirror 116, and the coupler 118, is optimized for pulsed laser operation. The continuous laser beam generated by the laser source 82 is passed through a laser optical system 86 which comprises a neutral density filter 122, one or more focusing lenses 124, and a shutter 128. The neutral density filter 122 reduces the intensity of all wavelengths or colors equally. The focusing lens 124 can have a focal length of from about 1 to about 20 cm, such as for example, 10 cm. The shutter 124 comprises a mechanical shutter capable of rapidly opening and closing, such as a mode locking or electro-optical shutter. By opening and closing rapidly, the shutter 124 can generate a pulsed laser beam 98 having laser pulses with pulse durations in nanoseconds or femtoseconds, as an output of the input continuous laser beam 120.

The pulsed laser beam 98 is selected and operated to provide pulsed laser bursts which have an output energy corresponding to a series of energy spikes that may be partially overlapping or entirely separated in time; in contrast to continuous wave lasers which produce a continuous laser output having a steady state equilibrium. The pulsed laser beam 98 emits pulsed laser bursts, which for example, can have a duration in the range of nanoseconds ($10^{-9}$ sec) or femtoseconds ($10^{-15}$ sec). The pulsed laser beam 98 cuts the battery substrate preform 78 with reduced delamination or microcrack formation, especially for crystalline cleaving substrates having cleavage planes. The pulsed laser beam was also found to work well on thin substrates which are sized less than 100 microns because such a thin substrate would absorb too much energy from a continuous laser beam and melt or otherwise deteriorate during the cutting operation. For example, it was determined that using a high power $CO_2$ laser operated in a continuously turned-on mode to cut a battery substrate preform 78 comprising cleavage planes and having a thickness of less than 100 microns, caused excessive localized heating and the resultant thermal shock often caused cracking and delamination of the cleavage planes of the substrate 28 or even delamination of the battery component films 30 from the thin substrate preform 78. The pulsed laser beam 98 was set up to pulsed laser bursts having an energy level sufficiently high to form a rapidly expanding thermal plasma of substrate material which then collapses to form shock waves that cut through the battery substrate 28 by mechanical disruption at the cutting region. The pulsed laser bursts provide sufficient energy to transform the substrate from a solid to a plasma phase which then expands away from the substrate 28 taking most of the heat away from the substrate 28. Essentially, the cut portions of the battery substrate preform 78 vaporize without going through a melting phase transition because the short duration of the pulses transmits less energy to the battery substrate 28 or preform 78 than a continuous laser beam.

In one version, the pulsed laser source 82 is a femtosecond laser comprising a diode-pumped solid-state laser with a lasing medium 104 comprising a rod of titanium doped sapphire. The femtosecond pulsed laser is set up to provide pulsed laser bursts having peak intensities of from about 1 to about 10 GigaWatts. However, the pulsed laser bursts are so short in duration that the delivered laser energy does not have sufficient time to dissipate across even the thin substrate preform 78 from the laser cutting beam spot to surrounding interlamellar cleavage planes of the battery substrate preform 78 via thermal conduction. Consequently, not enough heat is transferred to the preform 78 to melt the thin substrate or damage the planar cleavage structure of the battery substrate 24. This provides a clean laser cut with low residual fracturing around the cutting region and the absence of melting reduces splattering which would be otherwise result from molten substrate material formed around the cutting region of the substrate preform 78.

The pulsed laser source 82 can also use an ultraviolet laser to generate a continuous laser beam which is then formed into pulsed laser bursts as described above. The ultraviolet laser can be, for example, an excimer or 'excited dimer' laser, which is a chemical laser that uses a combination of an inert gas, such as argon, krypton, or xenon; and a reactive gas such as fluorine or chlorine, to generate a laser beam. Under appropriate electrical stimulation, a pseudo-molecule called a dimer—which exists only in an energized state—gives rise to laser light in the ultraviolet range which is well focused and capable of delicate control. Rather than burning or cutting material, the excimer laser adds enough energy to disrupt the molecular bonds of the surface of the battery substrate 28, which then effectively ablate and disintegrate into vapor rather than burn. Thus, the ultraviolet laser can be used to remove fine layers of surface material with almost no heating or change to the material left behind. From battery substrate cutting energy calculations it was determined that a suitable ultraviolet laser beam can be an excimer laser beam having a power level of from about 5 to about 80 microjoules, which is operated with a pulse duration of from about 1 to about 50 nanoseconds, and a pulse rate of from about 5 to about 200 Hz.

Thin battery substrate preforms 78 sized with thicknesses less than 100 microns, as well as battery substrate having cleavage planes joined by weak Van der Walls forces, were both found to be particularly well cut using controlled pulsed laser bursts from a pulsed laser beam 98. When cutting such battery substrates, the pulsed laser beam 98 is controlled to apply the pulsed power in energy and duration levels that do not cause the thin substrate to melt or splatter across it's cutting edge, or cause fracture of the cleavage planes that occur between the crystal sheets of the substrate material. Thus, the pulsed laser beam 98 is set to provide pulses of sufficient power and duration to cut through the substrate without melting or fracturing the cleavage planes by excessive heat loading. Several power measures can be used to set the power levels of the pulses of pulsed laser beam 28. As one example, the irradiance of the pulsed laser beam which is the power density of the pulsed laser source 82 and can be expressed in Joules/unit area can be used. Another measure is the fluence of the pulsed laser beam 98 which is the irradiance multiplied by the laser pulse duration or exposure time and is measured in $J/cm^2$. Yet another laser power level measure is the average energy output per pulse or Epulse, in joules.

In one example, a pulsed laser source 80 comprising a femtosecond laser source was set to energy levels and pulse durations that allowed cutting thin battery substrates 28 having cleavage planes with good results. In this example, the femtosecond pulsed laser beam 98 was set to provide an irradiance level of from about 1 to about 440 $J/cm^2$, and pulsed laser bursts having a pulse duration of from about 50 to about 600 femtosecond, for example, about 150 femtosecond. Based on this pulse duration, a suitable fluence level for the femtosecond pulsed laser beam 98 was calculated to be from about 10 to about 800 $J/cm^2$. The Epulse can be set to be from about 2 microjoules to about 100 millijoules, in one example, about 750 microjoules. The pulse repetition rate should also be set to provide good cutting, and in one example, the pulse repetition rate was set to be from about 50 to about 1000 Hz, for example, about 125 Hz. The vectorial velocity of the movable stage 84 was set to be from about 0.1 to about 40 mm/s, or even from 0.2 mm/sec to about 20 mm/sec.

In these examples, the pulsed laser beam 98 was also set to provide laser pulses having a peak laser fluence that depends on the type of battery substrate preform 78 being cut and the desired cutting parameters. Generally, the smoothest laser cut with least delamination or cleavage plane fracturing along the laser beam cutting edge was achieved with a pulsed laser beam 98 having a relatively low power density combined with slow beam traverse velocity across the stage surface 90. Also, the pulsed laser beam 98 was usually set to produce a laser cut having a surrounding damage area limited to a set distance, for example, less than about 50 microns from the cutting boundary. The pulsed laser cutting process can also be employed at any of several different stages of the battery fabrication process and the energy density required for the pulsed laser beam 98 depends on the thickness of, and layers formed on, the battery substrate 28. In one cutting process, a battery substrate preform 78 comprising mica is pre-cut into a plurality of smaller sized battery substrates 28 that each have a desired shape. The energy density or fluence of a pulsed laser beam 98 which was needed to cut a battery substrate preform 78 comprising only mica in a thickness of 10 to 15 microns, was estimated to be at least about 8 $J/cm^2$. As another example, cutting a thin adhesion layer 34 or cathode current collector film 38 required a pulsed laser beam 98 having a peak laser fluence of less than 0.2 $J/cm^2$. Without the thicker cathode layer 42, a much lower threshold of energy level was needed. However, the energy density required to cut a battery substrate preform 78 comprising a mica substrate and additionally, a cathode film 42 of platinum or titanium in a thickness of less than about 40 micron, was estimated to be less than 1.5 $J/cm^2$. Thus, when cutting a battery substrate preform 78 of mica having battery component films 30 including the adhesion film 34, cathode current collector film 38, and cathode film 42, and having a total thickness of about 40 microns, the pulsed laser beam 98 was set to provide a peak laser fluence of at least about 8 $J/cm^2$.

Microphotographs of a cut circular region on a battery substrate preform 78 which was cut using a femtosecond laser, as shown in FIGS. 5A to 5E, demonstrated that a pulsed laser beam 98 operated to provide femtosecond laser pulse bursts significantly improved cutting edges as compared to cuts from $CO_2$ laser which provided continuous laser power. In these examples, the pulsed laser cutter 80 used a laser source 82 comprising a CPA-2110 model titanium and sapphire laser, commercially available from Clark-MXR, Inc. The pulsed laser beam 98 had a wavelength of 775 nm, a power density of 19 $J/cm^2$, and a polarization which was linear and horizontal, and was used in the transverse mode, TEM00. The pulsed laser beam also had a beam diameter of 4 to 6 mm and a beam divergence of less than 100 microradians. The pulsed laser cutter 80 also used a movable stage 84 capable of providing a vectorial velocity of about 0.2 mm/sec. The pulsed laser cutter 80 was capable of providing a pulsed laser beam 98 with a pulse energy of greater than 0.8 mJ, pulse repetition rates of less than 1000 Hz, a pulse width of less than 150 fsec. In one example, the laser pulsed beam was set to provide a pulse duration of less than about 150 femtoseconds, an Epulse of 750 microjoules and a pulse repetition rate of 125 Hz. The pulsed laser beam 98 was operated at various laser fluence levels ranging from about 10 to about 500 $J/scm^2$, and including levels of 19, 27, 91, 210 and 440 $J/cm^2$. The movable stage 84 is set to provide different levels of vectorial velocity ranging from about 0.2 to about 20 mm/sec, for example, at 0.2, 1, 5, 10 and 20 mm/sec. The vectorial acceleration of the stage was set to levels ranging from about 0.5 to about 50 $mm/sec^2$, for example, at 0.8, 4, 20, and 40 $mm/sec^2$. The laser optical system 86 was set to provide normal incidence and the focusing lens 124 was a plano-convex lens with a focal length set to 10 cm.

Figure 5A:
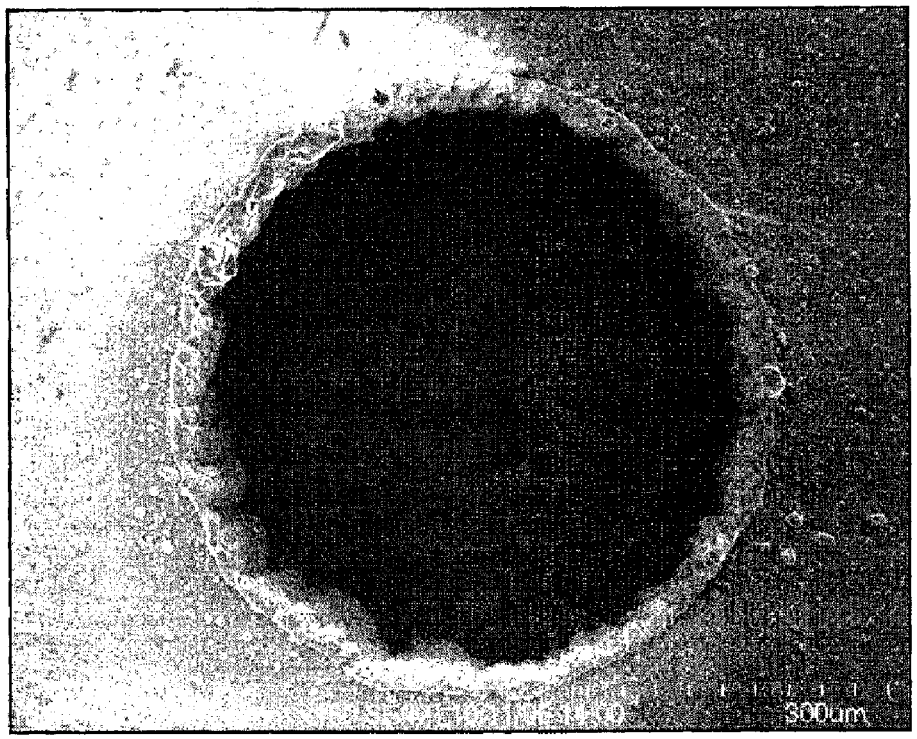
FIGS. 5A and 5B are scanning electron micrographs of top views of a hole cut in a battery substrate by a $CO_2$ laser (FIG. 5A), and by a pulsed femtosecond laser (FIG. 5B)
Figure 5B:
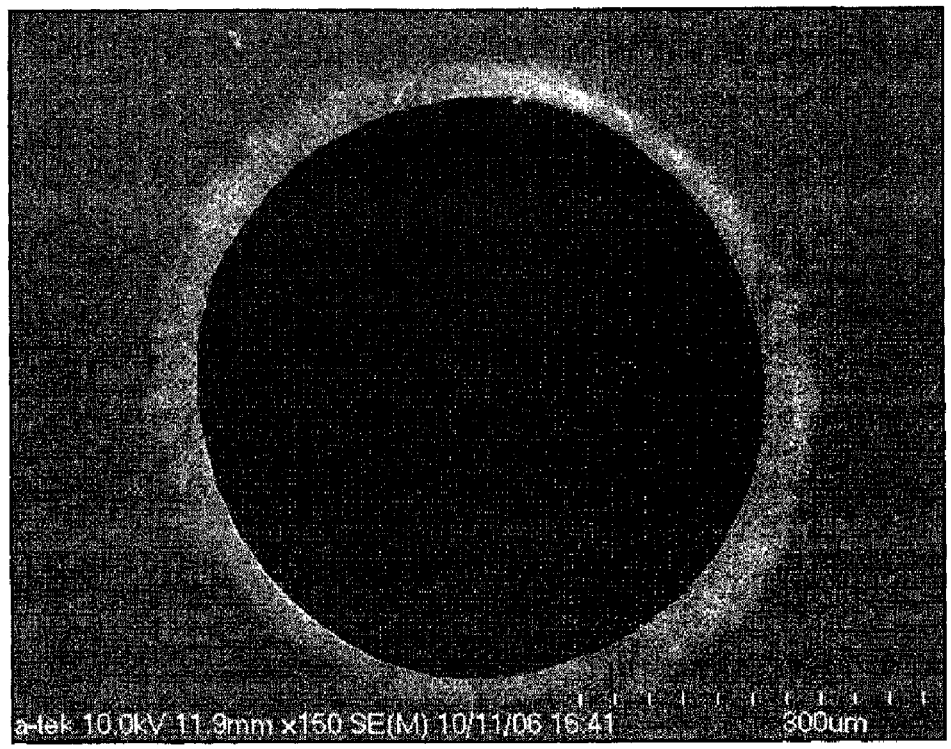
Figure 5C:
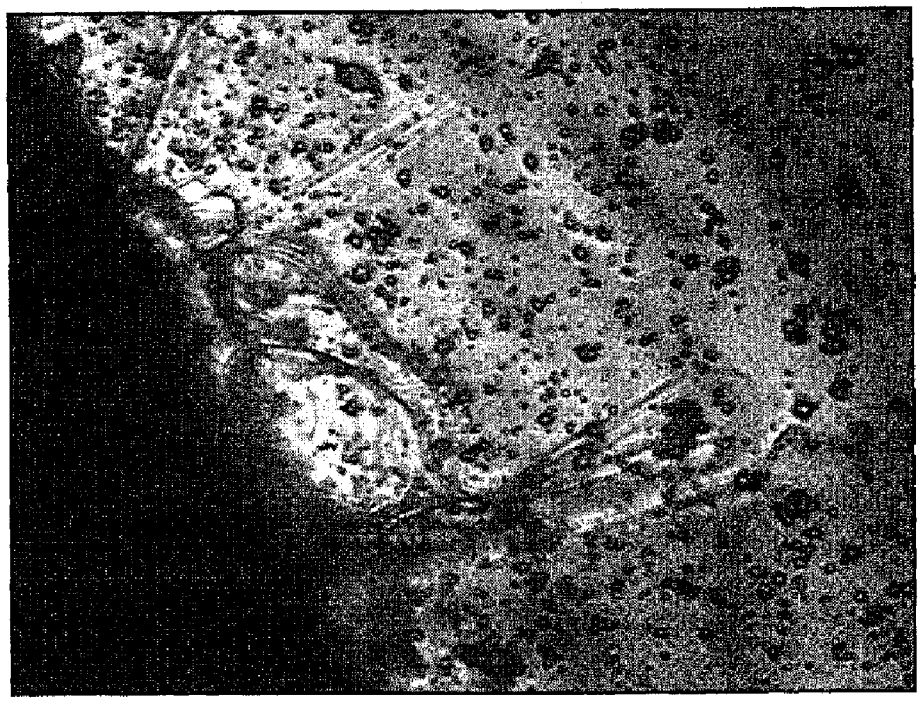
FIGS. 5C and 5D are optical microscope images of detailed sections of the holes cut in the battery substrate in FIGS. 5A and 5B, respectively.
Figure 5D:
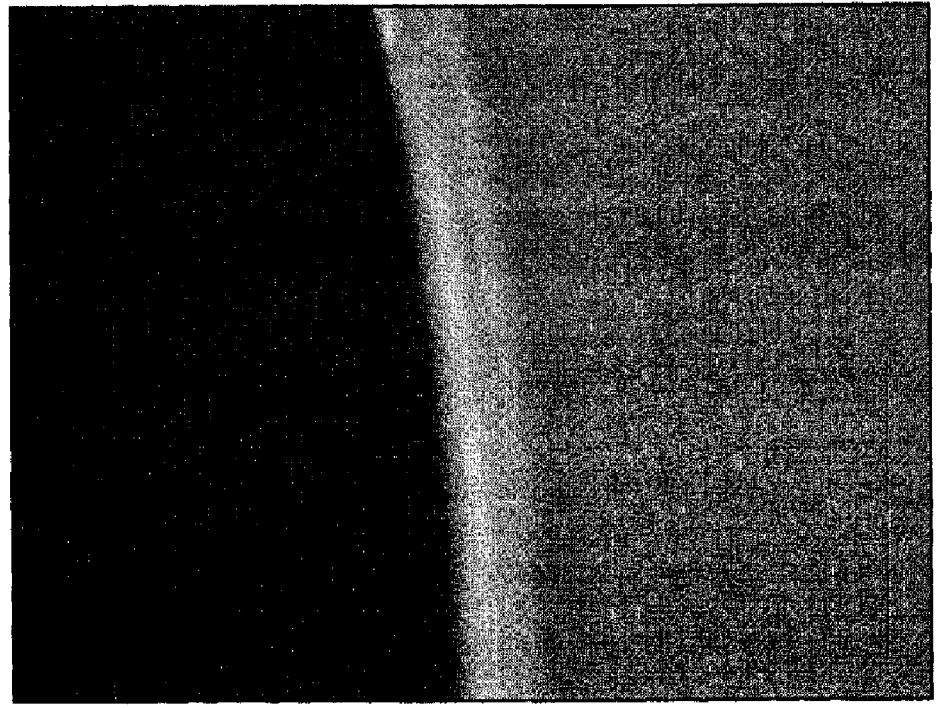
Figure 5E:
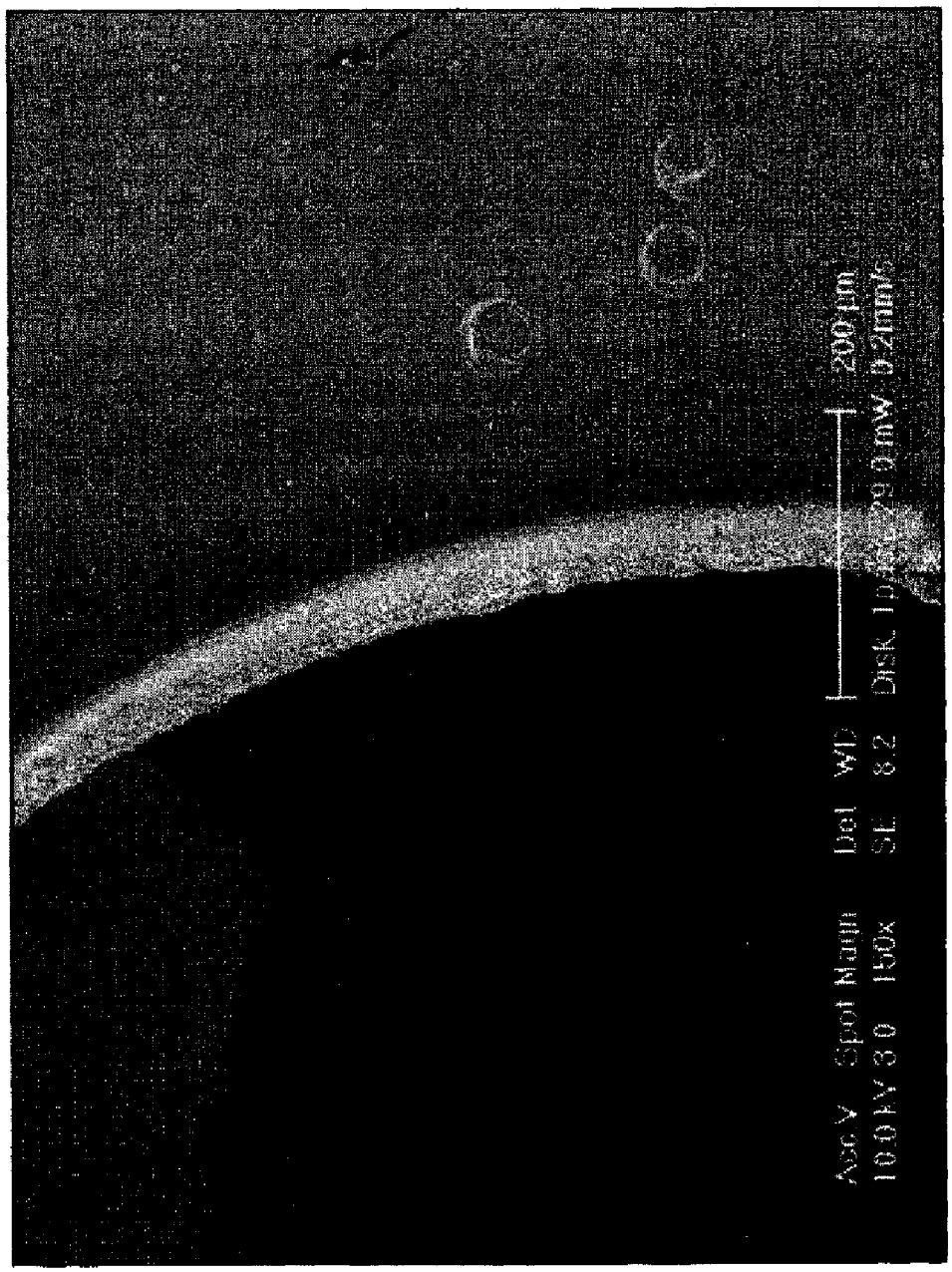
FIG. 5E is a scanning electron micrograph of a hole cut in a battery substrate by a pulsed femtosecond laser.

As seen from FIGS. 5A to 5E, the pulsed laser beam 98 operated at femtosecond laser pulses provided a clean laser cut with minimal surrounding damage to the substrate, while the $CO_2$ laser provided a cut with a large damaged area with splattering that exceeding 50 microns, or even 100 microns. FIG. 5A is a scanning electron micrograph of the top view of a hole cut in a battery substrate by a continuous laser beam of a $CO_2$ laser. It is seen that the carbon dioxide laser uses a cutting edge that is a rough and scarred, and contains bubbles and other defects. The splattering caused by the energy provided by the CO2 laser also caused damage extending a considerable distance into the substrate from the cutting edge. In contrast, FIG. 5B is a scanning electron micrographs of the top view of a hole cut in a battery substrate using a pulsed laser beam 98 operated at femtosecond pulses. This laser cut is much better one with a cleanly defined edge that is smooth and continuous and does not extend deep into the substrate. FIGS. 5C and 5D are optical microscope images of detailed sections of the holes cut in the battery substrate in FIGS. 5A and 5B, respectively, and these images also show the much better quality of cut obtained by the pulsed laser beam. FIG. 5E is another more detailed view of a scanning electron micrograph of a hole cut in a battery substrate by a pulsed femtosecond laser showing the clean cut and lack of delamination through cleavage planes.

Thus, as shown, the pulsed laser beam 98 provided significantly improved results with much less debris resulting from the splattered and molten material around the laser cut because the rapidly pulsed bursts of laser caused vaporization of substrate material without the splattering that otherwise occurred from the molten material generated by the carbon dioxide laser. These results are unexpected because the total energy provided by the pulsed laser beam far exceeded than provided by the carbon dioxide laser beam. Further, because the molten debris produced by the long pulse carbon dioxide laser was extremely hot as it landed on the substrate surface, it was difficult to remove this debris and such removal requires considerable post processing efforts and also often damages the substrate surface. The pulsed laser beam 98 generated fine dust which did not carry much heat, and consequently, did not melt and bond around the cut substrate surface. There were also much less observed delamination along cleavage planes because of the lower total energy transferred across the substrate preform 78 by the pulsed laser beam 98.

Another battery substrate 28 with overlying films 30 (having a thickness of 20 microns) was cut using a pulsed laser source with a pulsed ultraviolet laser operated to provide a laser beam 98 having a wavelength of 193 nm ($CaF_2$ was used), power level of 20 microjoules, and pulse width of about 8 nanoseconds. Good cutting results were obtained by cutting initially from a top side and then from the reversed bottom side to finish the cut. With this procedure, the bottom polished surface of the substrate 28 was not broken through, reducing the cleavage fracture and damage that would otherwise occur with such breakthrough.

Various exemplary cutting processes will now be described referring to the process flow charts of FIGS. 6A to 6C. In one cutting process, a battery substrate preform 78 of mica is partially pre-cut by a pulsed laser beam 98 into a loosely connected smaller battery substrates 28 that each have a desired shape but are still attached to one another in the large substrate preform 78, as shown in FIG. 6A. The whole larger area of the substrate preform 78 is then used to deposit all the battery component films to construct a thin film battery 20. When completed, the smaller thin film battery cells 20 are easily cut off from the large substrate preform 78 by the pulsed laser cutter 80.

In another example, some of the battery component films 30 are formed on a battery substrate preform 78 of mica which is then cut into smaller battery substrates 28 that each have a desired size and shape, as described in FIG. 6B. The remaining battery component films 30 are then deposited on the cut battery substrates 28 to construct a plurality of thin film batteries 20. For example, a cathode current collector film 38, cathode film 42, and an electrolyte film 44*a* can be deposited on a battery substrate preform 78 of mica, and only after such deposition, the preform 78 is cut into smaller pieces having the desired shapes and sizes. The width of the margin between the cut line along the battery substrate 28 and the nearest edge of a battery cells 24 is between about 1 and about 4 mm. After cutting the individual substrate pieces, the remaining battery component films 30 are deposited on the individual substrate pieces to construct various thin film battery cells 24.

In yet one more version, a battery substrate preform 78 of mica is deposited with all the battery component films 30 to construct one or more thin film battery cells 24 and then cut into a few smaller cells. In this example, the battery substrate preform 78 is deposited with battery component films 30 comprising a cathode current collector film 38, a cathode film 42, a metal film (not shown) to block the lithium ions from moving to the anode current collector layer covering a small area of the cathode film 42, and a electrolyte 44 layer covering the cathode film 42 and metal film. The substrate preform 78 with the deposited battery component films 30 is then cut with the pulsed laser beam. A small area of the stacked electrolyte and cathode films, away from the metal film, is then etched away by the pulsed laser beam 98 to expose the cathode current collector film. The anode current collector film 52 covering the electrolyte 44 in the same area as the metal layer. An anode film 48 covers the electrolyte film 44 and is in contact with the anode current collector film but not in contact with the cathode current collector film. After deposition of these films, the battery substrate preform 78 is then cut into smaller pieces that each form a battery substrate 28 comprising a battery 20.

In the example of FIG. 6C, a battery substrate preform 78 of mica is deposited with all the battery component films 30 needed to construct a thin film battery 20 as well as overlying protective layers is cut by a pulsed laser beam and the laser cut edges are sealed, as shown in FIGS. 7A to 7D. The battery 20 includes first and second battery cells 24*a,b* both formed on a first planar surface 26 of the substrate 28. Each battery cell 24*a,b* comprises a plurality of battery component films 30. For example, the battery 24*a* comprises an adhesion film 34*a*, cathode current collector film 38*a*, cathode film 42*a*, electrolyte film 44*a*, anode film 48*a*, and anode current collector films 52*a*. The cathode and anode current collector films 38*a*, 52*a*, respectively, have contact portions 160, 162 that extend out from the battery cell 24*a* to form electrical contacts that serve as positive and negative terminals for connecting the battery 20 to the external environment. An electrically conducting barrier layer 164*a,b* is formed on the contact portions 160, 162 in a thickness that is sufficiently large to prevent the pulsed laser beam 98 from cutting through the underlying contact portions 160, 162. The electrically conducting barrier layer 164*a,b* can be for example, a silver epoxy or silver paste, and is applied in a thickness of from about 5 to about 100 microns. An overlying protective multilayer coating 166 conforming to the external shape of the battery cells 24*a,b* is deposited over the battery component films 30 to protect them from erosion by the environment. The protective multilayer coating 166 can be for example, multiple ceramic and polymer layers which are deposited superimposed on one another, polymer layers, or other packaging layers.

The whole battery substrate preform 78 with the deposited battery component films 30, electrically conducting barrier layer 164*a,b* covering the contact portions 160, 162 that will serve as terminals, and the protective multilayer coating 166, is cut into smaller battery substrates that each include one or more of the battery cells 24*a,b*. In one step of the cutting process, as shown in FIGS. 7A and 7B, the protective conformal coating 166 covering the contact portions 160, 162 extending out from the battery cell 24*a* is burned off by the pulsed laser beam 98 to expose the underlying electrically conducting barrier layer 164*a,b*, respectively. An edge sealant 170 is then formed over the exposed region 172 of the protective multilayer coating 166 and a perimeter edge 174 of the contact portion 164*a,b* to sealed the laser cut edge while still exposing the contact portions 164*a,b* to serve as electrical terminals. In another step of the cutting process, as shown in FIGS. 7C and 7D, a portion of the protective multilayer coating 166 extending beyond the battery cell 24*a* and in direct contact with the underlying substrate 28 is cut by the pulsed laser beam 98 from the pulsed laser cutter 80. After the cutting operation, an edge sealant 170 is formed over the exposed region 170 of the laser cut edge to seal this region.

The edge sealant 170 is applied over the laser cut edge of the battery 20, as shown in FIGS. 7B and 7D, to reduce moisture seepage from the cut edge into the battery component films 30*a*. The edge sealant 170 can also be used to prevent the protective multilayer coating 166 from cracking or splitting as a result of the post laser cutting operation. In one example, the edge sealant 170 comprises an epoxy that is applied by hand painting, dipping or spraying along the path of the laser cut before/after the laser cut. The epoxy can be a thermosetting UV cured polymer, or an epoxy filled with ceramic or metal particles. The edge sealant 170 can also be applied as an epoxy strip simultaneously with or during the laser cutting operation. The sealing and simultaneously applied edge sealant 170 melts in the instantaneous heat provided by the pulsed laser beam 98, and as a result, seals the laser cut edge.

While illustrative embodiments of the thin film battery are described in the present application, it should be understood that other embodiments are also possible. Also, the packaging assembly of the present invention can be applied to contain and hermetically seal other type of batteries, as would be apparent to those of ordinary skill in the art. Thus, the scope of the claims should not be limited to the illustrative embodiments.

What is claimed is:

1. A method of fabricating a battery on a battery substrate, the method comprising:
   (a) selecting a battery substrate having cleavage planes;
   (b) applying a plurality of pulsed laser bursts of a pulsed laser beam to the battery substrate, the pulsed laser bursts having sufficient power and duration to cut through the battery substrate substantially without causing fractures along the cleavage planes of the battery substrate; and
   (c) before or after (b), depositing a plurality of battery component films on the battery substrate, the battery component films comprising at least a pair of electrodes about an electrolyte that cooperate to form a battery cell.

2. A method according to claim 1 wherein the battery substrate comprises a thickness of less than about 100 microns.

3. A method according to claim 2 comprising applying a pulsed laser beam comprising an ultraviolet laser beam having a power level of from about 5 to about 80 microjoules.

4. A method according to claim 3 comprising applying pulsed laser bursts having a duration of from about 1 to about 50 nanoseconds.

5. A method according to claim 3 comprising applying pulsed laser bursts having a pulse rate of from about 5 to about 200 Hz.

6. A method according to claim 1 comprising applying a pulsed laser beam generated by a lasing medium comprising titanium doped sapphire, and wherein the pulsed laser beam provides pulsed laser bursts having a duration of from about 50 to about 600 femtoseconds.

7. A method according to claim 6 comprising providing pulsed laser bursts having a fluence of from about 10 to about 800 J/cm$^2$.

8. A method according to claim 6 wherein the pulsed laser bursts are moved across the battery substrate with a vectorial velocity of from about 0.1 to about 40 mm/s.

9. A method according to claim 1 wherein (c) is performed before (b), and to deposit on the substrate in the order of deposition, battery component films comprising a cathode current collector film, a cathode film, an electrolyte, an anode, an anode current collector film, and a protective multilayer coating.

10. A method according to claim 1 further comprising applying an edge sealant to seal a laser cut edge formed by the pulsed laser beam.

11. A method according to claim 10 comprising applying an edge sealant comprising epoxy, ceramic particle filled epoxy, metal particle filled epoxy, or any thermoset UV cured polymer.

12. A method of fabricating a battery on a battery substrate, the method comprising:
   (a) selecting a battery substrate having cleavage planes;
   (b) applying to the battery substrate, a plurality of pulsed laser bursts of a pulsed laser beam comprising an ultraviolet laser beam having a power level of from about 5 to about 80 microjoules, the pulsed laser bursts having sufficient power and duration to cut through the battery substrate substantially without causing fractures along the cleavage planes of the battery substrate; and
   (c) before or after (b), depositing a plurality of battery component films on the battery substrate, the battery component films comprising at least a pair of electrodes about an electrolyte that cooperate to form a battery cell.

13. A method according to claim 12 wherein the battery substrate comprises a thickness of less than about 100 microns.

14. A method according to claim 12 comprising applying pulsed laser bursts having a duration of from about 1 to about 50 nanoseconds.

15. A method according to claim 12 comprising applying pulsed laser bursts having a pulse rate of from about 5 to about 200 Hz.

16. A method of fabricating a battery on a battery substrate, the method comprising:
   (a) selecting a battery substrate having cleavage planes;
   (b) cutting the battery substrate by applying a plurality of pulsed laser bursts having a fluence of from about 10 to about 800 J/cm$^2$; and
   (c) before or after (b), depositing a plurality of battery component films on the battery substrate, the battery component films comprising at least a pair of electrodes about an electrolyte that cooperate to form a battery cell.

17. A method according to claim 16 wherein the battery substrate comprises a thickness of less than about 100 microns.

18. A method according to claim 16 comprising applying pulsed laser bursts having a pulse duration of from about 50 to about 600 femtoseconds.

19. A method according to claim 16 comprising applying pulsed laser bursts having a pulse repetition rate of from about 50 to about 1000 Hz.

20. A method according to claim 16 wherein the pulsed laser bursts are generated from a laser beam having a power density of from about 1 to about 440 J/cm$^2$, and wherein (b) comprises moving the pulsed laser bursts across the battery substrate with a vectorial velocity of from about 0.1 to about 40 mm/s.

* * * * *